United States Patent
Jiang et al.

(10) Patent No.: US 10,837,425 B2
(45) Date of Patent: Nov. 17, 2020

(54) HUB MATING MECHANISM APPLICABLE TO SINGLE BLADE INSTALLATION OF OFFSHORE WIND TURBINES

(71) Applicant: DALIAN UNIVERSITY OF TECHNOLOGY, Liaoning (CN)

(72) Inventors: Zhiyu Jiang, Liaoning (CN); Zhengru Ren, Liaoning (CN); Wei Shi, Liaoning (CN); Dezhi Ning, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 47 days.

(21) Appl. No.: 16/340,047

(22) PCT Filed: Sep. 11, 2017

(86) PCT No.: PCT/CN2017/101168
§ 371 (c)(1),
(2) Date: Apr. 5, 2019

(87) PCT Pub. No.: WO2019/047195
PCT Pub. Date: Mar. 14, 2019

(65) Prior Publication Data
US 2020/0032774 A1  Jan. 30, 2020

(51) Int. Cl.
*F03D 13/10* (2016.01)
*F03D 1/06* (2006.01)
(Continued)

(52) U.S. Cl.
CPC .......... *F03D 13/10* (2016.05); *F03D 1/0658* (2013.01); *B66C 1/108* (2013.01); *F03D 13/20* (2016.05);
(Continued)

(58) Field of Classification Search
CPC .... F03D 1/0658; F03D 80/50; Y10T 29/4978; F05B 2230/61; F05B 2230/80; F05B 2240/916
See application file for complete search history.

(56) References Cited

U.S. PATENT DOCUMENTS 9,599,093 B2 * 3/2017 Bitsch .................... F03D 13/10
2010/0313417 A1 12/2010 Lebon

FOREIGN PATENT DOCUMENTS

CN         105253795 A    1/2016
CN         106089566 A    11/2016
(Continued)

*Primary Examiner* — Kenneth J Hansen
*Assistant Examiner* — Brian O Peters
(74) *Attorney, Agent, or Firm* — Muncy, Geissler, Olds & Lowe, P.C.

(57) ABSTRACT

A hub mating mechanism for single blade installation of offshore wind turbines. The mechanism includes a rigid circular snap ring having circumferential contact with the hub, spring damper, force actuator, buffer plates made from resilient composite material, controller and electric motor. The ring is connected to the buffer plates through the spring damper and the force actuator. The roots of the buffer plates are connected to the outer edge of the hub by hinges. The force actuator is driven by the controller and electric motor placed in the nacelle. Multiple flange holes are formed in the blades and the hub fixed together through bolts after the mating is completed. Assembly and testing of the hub mating mechanism can be performed during component assembly onshore. The hub mating mechanism includes the circular snap ring, buffer plates, force actuator, spring damper, controller and electric motor which are off-the-shelf commercial products.

3 Claims, 3 Drawing Sheets

(51) Int. Cl.
   *F03D 13/20*  (2016.01)
   *F03D 80/50*  (2016.01)
   *B66C 1/10*  (2006.01)
(52) U.S. Cl.
   CPC ...... *F03D 80/50* (2016.05); *F05B 2230/6102* (2013.01)

(56) References Cited

FOREIGN PATENT DOCUMENTS

| | | |
|---|---|---|
| CN | 206329442 U | 7/2017 |
| CN | 107387329 A | 11/2017 |
| CN | 207111310 U | 3/2018 |
| EP | 3492734 * | 5/2019 |

* cited by examiner

HUB MATING MECHANISM APPLICABLE TO SINGLE BLADE INSTALLATION OF OFFSHORE WIND TURBINES

TECHNICAL FIELD

The present invention belongs to marine technology. It refers to the hub mating mechanism is suitable for offshore wind turbine installation which lifts a single blade each time.

BACKGROUND

The offshore wind turbines in the world are divided into fixed and floating foundations according to the types of support structures. Most existing offshore wind farms adopted monopiles as the main bottom-fixed support structures, which were suitable for shallow waters with a depth of less than 40 meters. The installation methods of offshore wind turbines can be divided into component hoisting and assembly hoisting. For large-scale wind turbines, a popular installation method is to transport multiple wind turbines with a self-elevating jack-up installation vessel. Individual blades, towers, and nacelles are separately stored in the deck area. In order to reduce the effect of wave forces during the installation, the jack-up legs are drilled into the seabed after arrival at the site, and the deck is elevated above the sea level. Thus, a stable platform is used for the crane operation. Afterwards, installation of tower, nacelle, and blades take place subsequently.

During the hoisting of a single blade, a yoke system is adopted to fix the center of gravity and the orientation of the blade. Then the blade position is adjusted and controlled by ropes connecting the crane until the root of the blade is mated with the hub at the tower top. During the lifting process, the blades will move and rotate because the wind loads acting on the blade is changing under wind turbulence. At the same time, the tower will vibrate due to the wave loads, which causes the position of the hub to change. This brings challenges for the blade mating process. Since it is difficult to align the blade root and hub flange during the mating process, manual assistant of the banksman during the operation is needed, resulting in high costs and risks during offshore installation, which limit the development of offshore wind power to a certain extent.

SUMMARY

This invention is designed to overcome the above difficulties during the blade installation. The present invention proposes an auxiliary device for the installation and mating of a single blade to facilitate the mating between the hub flange and the blade root.

The Technical Scheme

A hub mating mechanism suitable for the single blade installation of the wind turbine, —comprising the circular collar 14, the spring-damper 15, force actuator 16, buffer plate 17, controller and electric motor;

The circular ring 14 is a rigid structure and it surrounds the hub 5. It is connected to the buffer plate 17 by the spring-damper 15 and the force actuator 16.

The buffer plate 17 is made of resilient composite material. The root of the buffer plate 17 are connected to the outer edge of the hub 5 by connecting hinge 1 which could revolve around the root of the hub.

The damper 15 is made of rubber.

The force actuator 16 is driven by the controller and the electric motor housed in the hub.

A plurality of flange holes 12 on the blade 3 and the hub 5, bolts are used for fixing after docking of the blade and hub.

The hub mating mechanism in this invention should be installed on the hub 5 when the wind turbine is manufactured. Testing of the mechanism should be completed. Before the blade is installed, the initial angle of the buffer plate 17 should be adjusted by the force actuator 16. The opening angle of the buffer plate 17 should be increased under harsh environment such as high wind speed to improve the success rate of mating. Under the effect of wind loads, the blade root may experience planar motions. By the action of the buffer plate 17, the blade root motion is limited and the mating process is guided.

During the mating, impact will happen between the blade roots 10 and the buffer plate 17. Since the rigidity of the buffer plate 17 is far below the blade root 10, there will be no damage on the blade 3 since the collision energy is absorbed by the damper spring 15. When the motion range of the blade root 10 is within the buffer plate 17, the force acting through 16, the opening angle of buffer plate 17 is reduced dynamically, which assist the mating successfully.

When the root 10 is docked successfully and fixed to the hub 5 by the bolts, the buffer plate is opened 17 completely by the force actuator and fixed to the circular ring 14. The hub mating mechanism in this invention has no negative effect on blade 3 during the operation.

The hub mating mechanism for single blade installation of offshore wind turbines in this invention is applicable to MW-sized horizontal axis offshore wind turbines which adopt the single blade installation method.

Advantages of the Invention:

1. The installation and testing of the mechanism could be completed during installation of nacelle components onshore. The components of the hub mating mechanism, the circular ring, the buffer plate, the force actuator, the spring damper, the controller, the electric motor, are off-the-shelf commercial products and easy to construct.

2. The time and cost during offshore blade installation can be reduced.

3. When the blades are mated, the labor cost is reduced with improved automation. The operation safety is improved also.

In the Figs: 1 Automatic lifting installation machine; 2 horizontal cable; 3 blade; 4 crane; 5 hub; 6 nacelle; 7 tower; 8 monopile; 9 hub outer edge; 10 blade root; 11 connecting hinges; 12 flange hole; 13 center of gravity of the blade; 14 circular ring; 15 spring damper; 16 force actuator; 17 buffer plate.

DETAILED DESCRIPTION

Combined with the drawings and examples, further description will be given below.

Figure 1A:
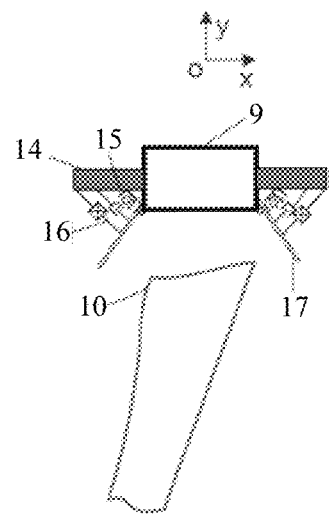
FIG. 1(a) is the top view of the hub mating mechanism and blades before mating.
Figure 1B:
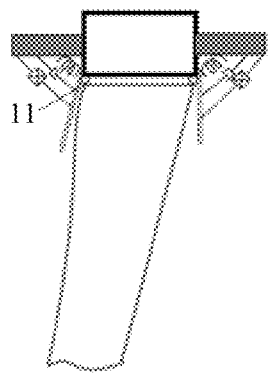
FIG. 1(b) is the top view of the hub mating mechanism and blades before mating.
Figure 1C:
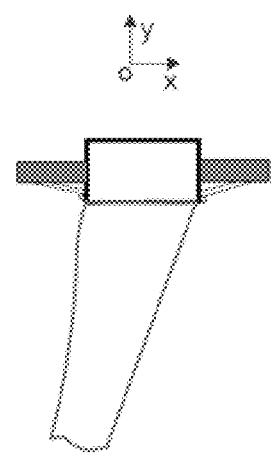
FIG. 1(c) is the top view of the hub mating mechanism and blades before mating.

FIG. 1 is a side view of the offshore blade installation (XZ plane). X is the wind speed direction. Taking the 5 MW wind turbine as an example, the length of the blade 3 is 61.5 meters, the blade root 10 is circular, the diameter is 3.5 meters which is slightly smaller than the hub. The horizontal height is of the nacelle 6 is 90 m above the sea level. The blade 3 is connected to the crane cable 4 by two horizontal cables (11 and 12) and a vertical cable. The movement of blade 3 in the xz plane is limited by the horizontal cables. Lift blade 3 from the jack-up ship 1 by the crane 4 to the horizontal height of hub for the preparation of the mating.

Figure 2:
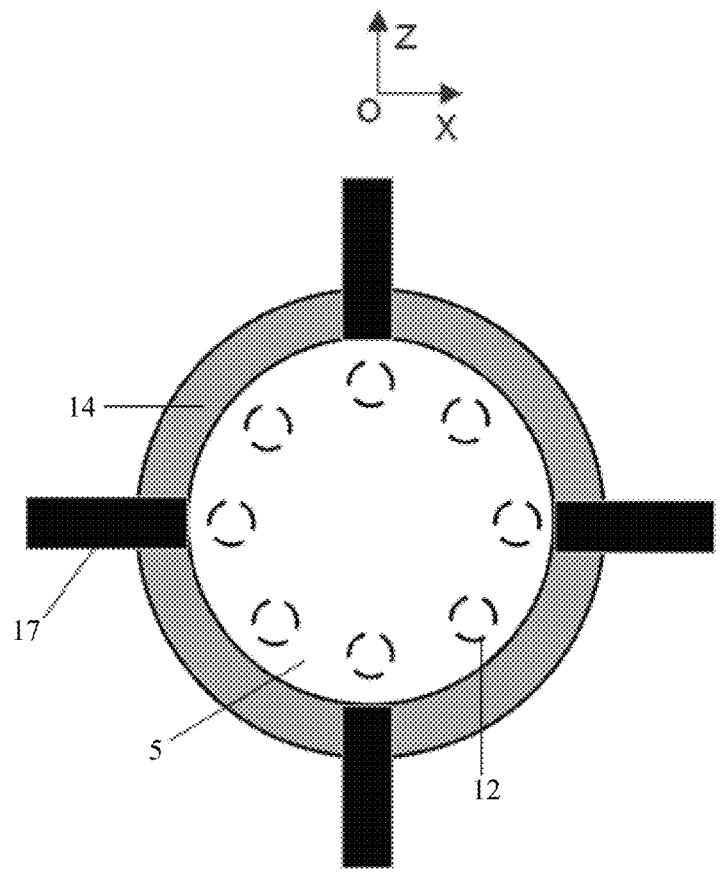
FIG. 2 is the side view of the hub mating mechanism, where the force actuator and the spring-damper are not included.

FIG. 2 is the traditional installation process of a single blade. Under the action of turbulent wind, it is difficult to limit the motion of the blade root 10 completely by horizontal cables, and it is not easy to for the alignment and mating of blade 10 and hub 5 in a short time. Thus, manual assistance is needed.

Figure 3:
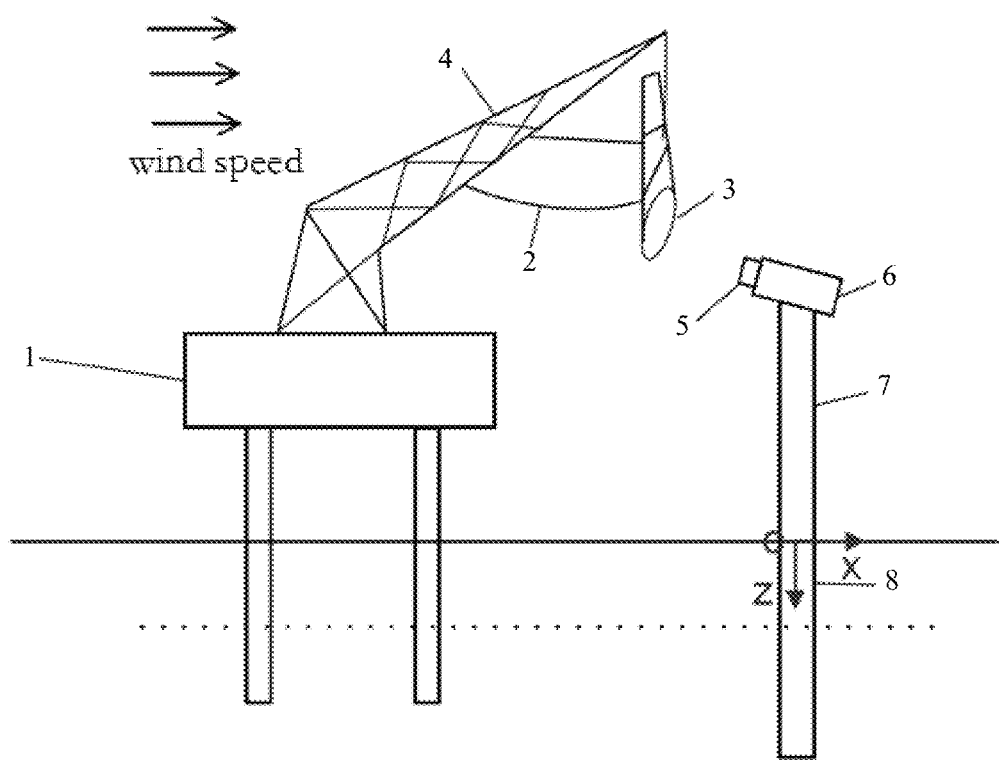
FIG. 3 is the blades installation diagram of the traditional offshore monopile-type wind turbine.
Figure 4:
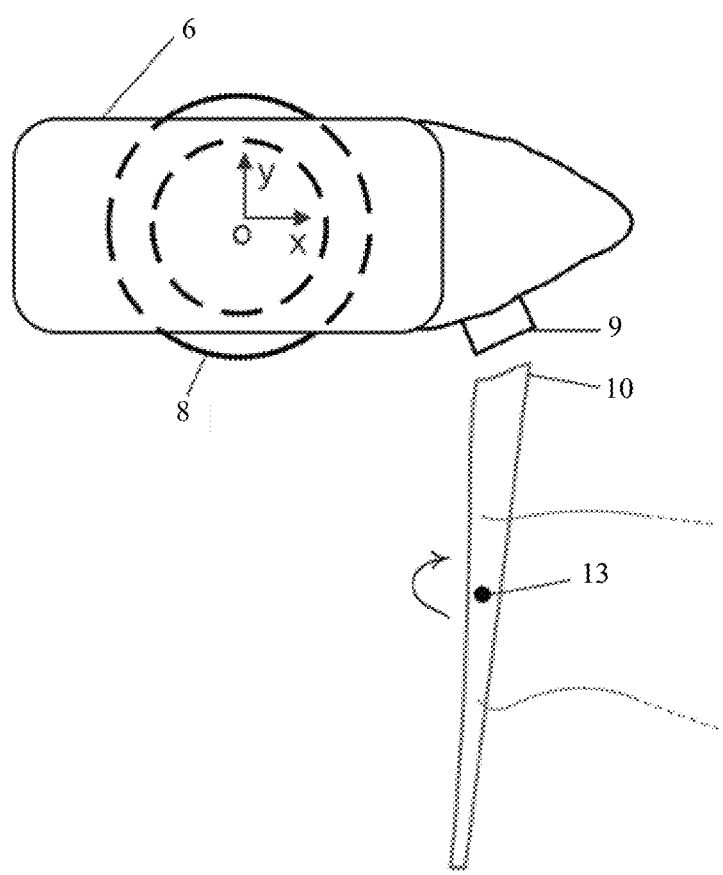
FIG. 4 is the single blade installation diagram.

FIG. 3 is the installation way which hub mating mechanism in this invention is adopted and the angle changes of the buffer plate 17 during the mating. Circular ring 14, which is designed to be 10 cm thick, is fixed to the hub 5. The length of the buffer plate is 2 m. the opening angle could vary within 180 degree. Force actuator 16 is a piston structure driven by the electric motor. The range of output force and the diameter of spring damper 15 could be designed according to the wind resources of the wind farm site, blade dimension as well as the ultimate load during the collision.

Before mating, the angle of cushion plate 17 is opened by the remote controller of the force actuator. After the blade root 10 enters the range of buffer plate 17, mating begins. The buffer plate 17 will have a tight contact with the blade root 10 to assist the mating with hub 5. After mating, the end of the buffer plate 17 and the circular ring 14 are fixed by controlling the force actuator 16 remotely. Thus, the blade installation is finished.

We claim:

1. A hub mating mechanism applicable to the installation of a blade in an offshore wind turbine, the hub mating mechanism comprising: a circular ring, a spring damper, a force actuator, buffer plates, a controller and an electric motor;

wherein the circular ring is a rigid structure and surrounds a hub; the circular ring is connected to the buffer plates by the spring damper and the force actuator;

the buffer plates are made of a resilient composite material; one end of each buffer plate is connected to an outer edge of the hub by rotating hinges such that the buffer plates are capable of rotating around a hub root; and the force actuator is driven by the controller and the electric motor, the controller and electric motor being located in a nacelle of the offshore wind turbine.

2. The hub mating mechanism of claim 1, wherein the spring damper is made of rubber.

3. The hub mating mechanism of claim 1, wherein the blade and hub are fixed by bolts extending through flange holes in the blade and the hub.

* * * * *